(12) United States Patent
Bernard

(10) Patent No.: US 6,769,840 B1
(45) Date of Patent: Aug. 3, 2004

(54) APPARATUS AND METHOD FOR DEPLOYING AN OBJECT UNDER WATER

(76) Inventor: François Bernard, Willem de Zwijgerlaan 91, NL-2582 Den Haag (NL)

( * ) Notice: Subject to any disclaimer, the term of this patent is extended or adjusted under 35 U.S.C. 154(b) by 0 days.

(21) Appl. No.: 10/239,240
(22) PCT Filed: Mar. 20, 2000
(86) PCT No.: PCT/NL00/00183
§ 371 (c)(1), (2), (4) Date: Sep. 20, 2002
(87) PCT Pub. No.: WO01/70564
PCT Pub. Date: Sep. 27, 2001

(51) Int. Cl.[7] .............................. F16L 1/12; F16L 1/20
(52) U.S. Cl. ........................................ 405/169; 405/166
(58) Field of Search ................................. 405/158, 166, 405/169, 195.1, 178, 184.4; 254/134.3 SC; 114/243

(56) References Cited

U.S. PATENT DOCUMENTS

| | | | |
|---|---|---|---|
| 1,818,922 A | * | 8/1931 | Parker ........................ 138/112 |
| 3,425,453 A | * | 2/1969 | Fuller ........................ 138/111 |
| 3,461,830 A | | 8/1969 | Pearce et al. ............... 114/243 |
| 3,604,731 A | | 9/1971 | Petersen ..................... 285/29 |
| 3,699,692 A | | 10/1972 | Smith ........................ 405/169 |
| 3,713,275 A | | 1/1973 | Hyatt ......................... 405/169 |
| 4,529,009 A | * | 7/1985 | Horner et al. .............. 138/111 |
| 5,004,826 A | * | 4/1991 | Dingwall et al. ........... 558/169 |
| 5,236,016 A | * | 8/1993 | Vogelsang .................. 138/115 |
| 5,586,750 A | | 12/1996 | Ezoe ................. 254/134.3 SC |
| 5,738,034 A | * | 4/1998 | Wolff et al. ................. 114/243 |
| 5,901,756 A | * | 5/1999 | Goodrich .................... 138/167 |
| 6,179,269 B1 | * | 1/2001 | Kobylinski .......... 254/134.3 R |

FOREIGN PATENT DOCUMENTS

| | | |
|---|---|---|
| FR | 2 155 509 A | 5/1973 |
| GB | 108 761 A | 8/1917 |

* cited by examiner

Primary Examiner—Thomas B. Will
Assistant Examiner—Tara L. Mayo
(74) Attorney, Agent, or Firm—Young & Thompson

(57) ABSTRACT

An apparatus and a method for deployment of an object in a fluid, e.g. the sea, with at least a first (4) and a second cable (5), to be connected to the object, the apparatus comprising winch elements for reeling in and out the cables (4, 5) in order to allow movement of the object with respect to the apparatus. The apparatus is provided with a bundling apparatus (10) for bundling the cables, when reeled out, in order to provide a single cable assembly between the apparatus and the object during deployment. The apparatus and the method are not only adapted for bundling cables when reeling out the cables during deployment, but the apparatus and the method are adapted for removing a bundling element (13) from the cables when reeled in during recovery.

29 Claims, 8 Drawing Sheets

APPARATUS AND METHOD FOR DEPLOYING AN OBJECT UNDER WATER

BACKGROUND OF THE INVENTION

The invention relates to a deployment apparatus for deployment of an object in a fluid, e.g. the sea, by means of at least a first and a second cable, to be connected to the object, the apparatus comprising winch means for reeling in and out the cables in order to allow movement of the object with respect to the apparatus.

The apparatus and method according to the present invention can be used for deploying an object, for instance from a vessel towards the seabed. It is known to use several cables for connecting such an object to the vessel. A first cable being a load carrying cable and a second cable being a data and power umbilical. In this text reference will be made towards such a lifting cable and such an umbilical. However it should be noted that the present invention could also be used when three of more cables are used when deploying the object, by adapting the basic design of the apparatus.

The load carrying cable and the data and power umbilical, when deploying a load in the sea, will have a different flow profile and therefore a different drag profile. Especially when employing at high depth, there will always be a risk that both cables will get tensed by the current and get entangled into each other.

SUMMARY OF THE INVENTION

It is the object of the present invention to provide an apparatus and a method for deploying an object, e.g. from a vessel towards the seabed, without having the risk of cables getting entangled, while providing more control of the cables when deploying the object.

This object according to the present invention is achieved in that the apparatus is provided with a bundling apparatus for bundling the cables, when reeled out, in order to provide a single cable assembly between the apparatus and the object during deployment.

Because of this measure the drag will be exerted on the assembly in stead of on separate cables, therefor the control on the movement can be improved.

According to the invention it is possible that the bundling apparatus is adapted to enclose the first and the second cable by means of discrete bundling elements. These discrete bundling elements preferably are formed as rings or clips.

In order to be able to use the apparatus not only during deployment, but during recovery as well, it is preferred that the bundling apparatus is adapted for application to and removal from the bundling elements from the cables.

According to one embodiment of the invention the bundling apparatus is provided with a storage for bundling elements, such as clips. Moreover the bundling apparatus is provided with a dispenser assembly, the dispenser assembly being movable between a storage position adjacent the storage for feeding one or more clips to the dispenser assembly and a cable position, adjacent to the path of the cables through or along the apparatus, for application of the clips are,id the at least first and second cable.

For applying and removing of the clips from the cable assembly the dispenser assembly is provided with means for opening and closing a clip, wherein the means for opening and closing a clip comprise pins, which pins cooperate with respective holes in the clips. In an embodiment the pins for opening and closing a clip are fixed on a first and a second lever, the levers being connected to a single actuating element. It is possible that the actuating element is a pneumatic cylinder.

As an alternative it is possible that the apparatus is provided with a cable guide, for guiding the cables along the cable position.

As an alternative the bundling means are adapted for enclosing the first and second cable by means of a continuous enclosure, wherein the bundling means are adapted to enclose the first and second cable by means of an enclosure foil.

As a further alternative the bundling apparatus is adapted for connection by both first and second cable by means of a continuous snap lock.

Preferably the apparatus according to the invention is provided with a first winch for reeling in and out a first cable and a second winch for reeling in and out a second cable, wherein the first and second winch are provided with control means which cooperate in order to synchronise the cable speed of both first and second cable. Moreover the apparatus can comprise sensor means for measuring the movement of the first winch, the sensor means, by means of processing means, being connected to the control means of the second winch, for controlling the speed of the second winch dependent on the speed of the first winch.

In order to ensure safe and secure connection of the bundling elements to the cables the apparatus is provided with sensor means for measuring the speed of the cables with respect to the apparatus, the sensor means being connected to apparatus by means of processing means, such as a computer, for controlling the apparatus dependent on the speed of the cables.

According to a possible embodiment the apparatus is provided with a frame, the flume carrying a sheave for guiding the cables, wherein the bundling apparatus is positioned downstream of the sheave when regarding the cable movement during deployment, wherein the sheave is provided with a double groove for accommodating both a first and a second cable, in order to synchronise the cable speed of both cables.

The invention also relates to a clip adapted to receive a first and a second cable, the clip being movable from a first position for receiving the cables and a second position, wherein the clip is closed for enclosing the cables, wherein the clip is provided with a snap lock. The clip according to the invention the clip is provided with two or more through holes, the through holes being adapted to receive opening and closing pins. The clip comprise a relatively stiff section, for receiving a first cable, which stiff section adjoins a relatively flexible section, for receiving a second cable, wherein the snap lock is provided in the relatively flexible section.

According to a further aspect according to the invention, the invention relates to a method for deploying a load in a fluid, e.g. the sea, the load being raised and lowered by means of at least a first and a second cable.

The method according to the invention is characterised in that the first and second cables are connected to form a single cable assembly prior to lowering the cables into the water.

According to the invention the cables are connected by means of discrete bundling elements, wherein the discrete bundling elements are interconnected by means of threads, wherein a further bundling element engages the cables by pulling the further bundling elements towards the cables by means of the interconnection, wherein the cable speed is used for engagement of the further bundling element to the cable.

As an alternative the cables are connected by means of a continuous bundling element, wherein the continuous bundling element has the form of a continuous snap lock element, the elements being adapted for receiving at least a first and a second cable. The cables can also be connected by means of braiding.

BRIEF DESCRIPTION OF THE DRAWINGS

The invention will be described with reference to the accompanying drawing wherein.

DESCRIPTION OF THE PREFERRED EMBODIMENTS

Figure 1:
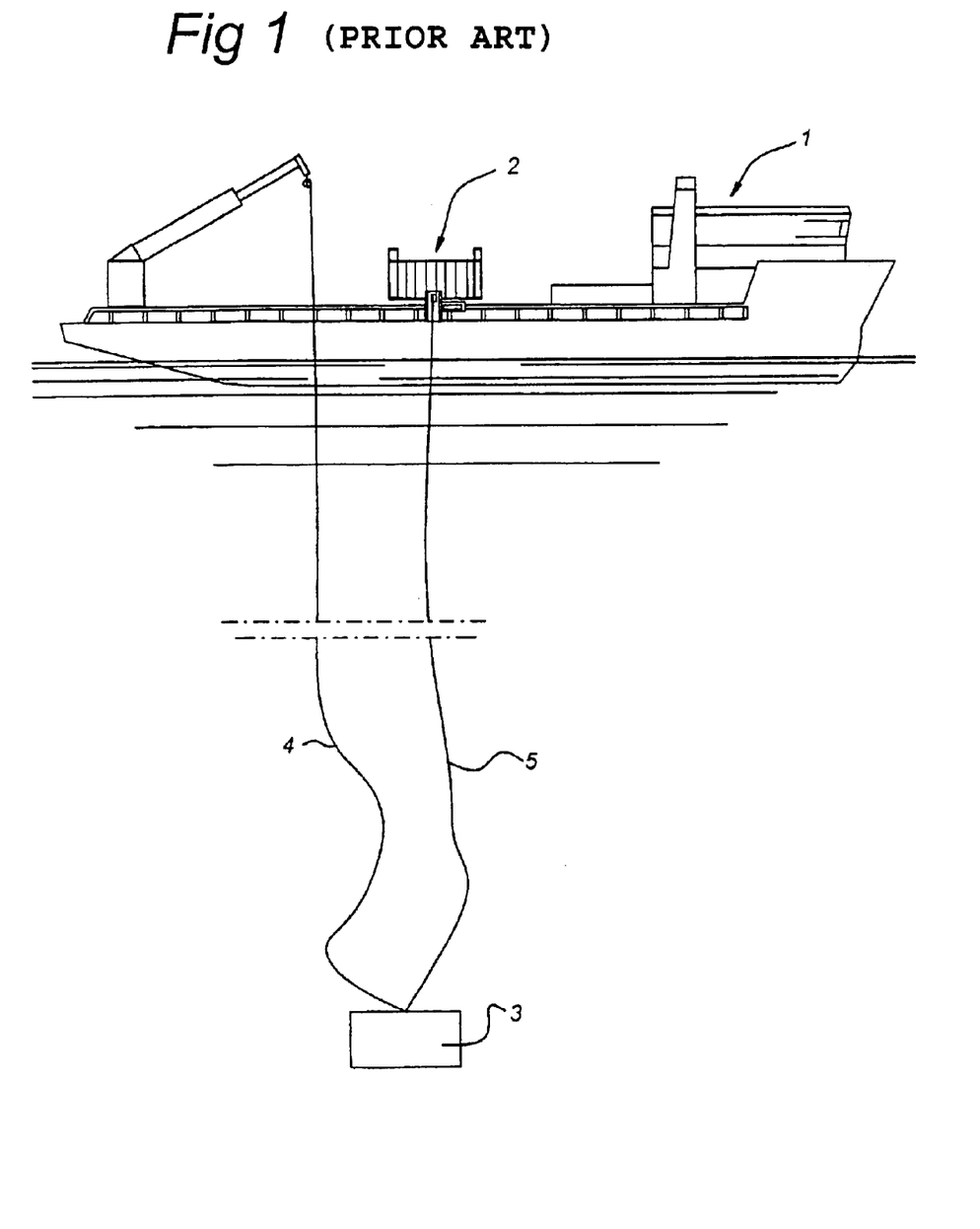
FIG. 1 shows a vessel, deploying an object wherein the object is connected to the vessel by means of two cables, the cables being free to move with respect to each other.

In FIG. 1 a vessel 1 is shown provided with means 2 for deploying an object 3. The object 3 is connected to the deployment means by cables 4 and 5. The cable 4 being a load carrying cable, or lifting cable, and the cable 5 being a data and power umbilical. Both cables 4, 5 will have a different flow profile. As diagrammatically shown in FIG. 1 the cables will be free in the water and will be moving with respect to each other. Therefore the danger will be present that both cables 4, 5 will be entangled. Moreover when both cables 4, 5 will move independently through the water the control for the movement of the object 3 with respect to the vessel 1 will be endangered.

Figure 2:
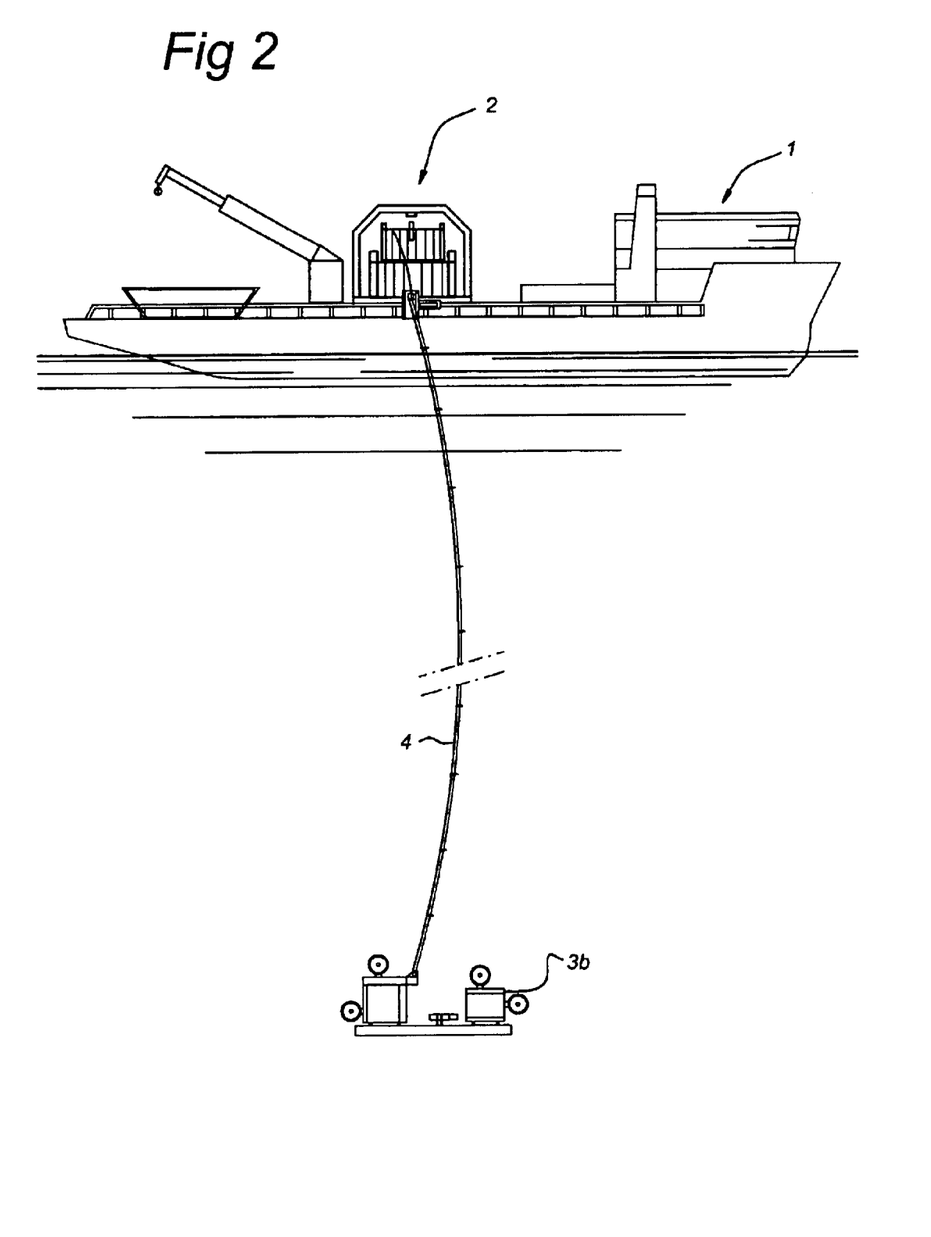
FIG. 2 shows the deployment of an object according to the present invention wherein a first and a second cable are bundled.

In FIG. 2 the vessel 1 is shown wherein an object 3b is deployed by means of a deployment device 2. According to FIG. 2 the first and second wire 4, 5 are connected to each other by means of bundling means. This means can be provided in the form of clips, as will be described below. The object 3b according to FIG. 2 can be a ProMaster as described in the earlier filed patent application PCT/NL99/00242. Because of the connection between both cables 4, 5 there is no danger for entangling. Moreover the control of the ProMaster 3b with respect to the vessel 1 can be achieved with more accuracy than in case both wires would be free to move independently.

Figure 3:
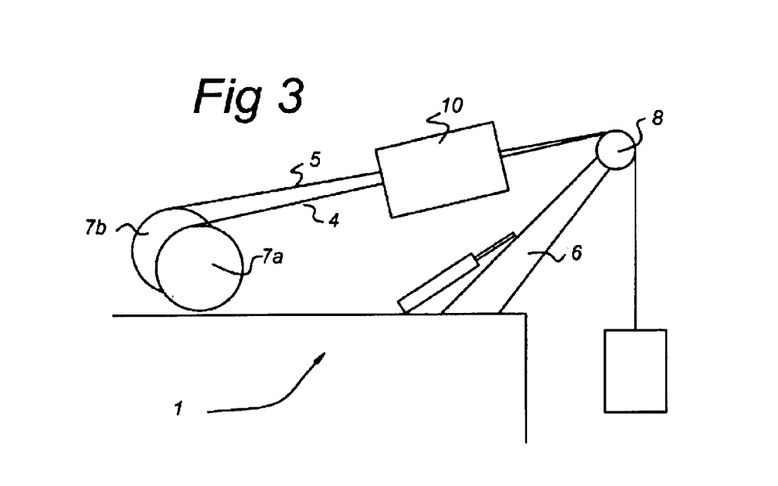
FIG. 3 shows a schematic view of a possible position of the bundling apparatus system according to the present invention on the vessel.

In FIG. 3 the means for deploying the ProMaster 3b are shown schematically. The means comprise an A-frame 6 which is movably connected to the vessel 1. Moreover the means are provided with winches 7a and 7b for reeling in and out both cables 4 and 5. In FIG. 3 two winches are shown. A first winch 7a will be referred to as being the main winch. This winch is used for reeling in and out a load carrying cable 4. This cable for instance could be a synthetic cable. A second winch 7b will be refereed to as being an umbilical winch. This winch will be used for reeling in and out an umbilical 5, while being synchronised from a control point of view and the tension is monitored. Between the winches 7 and a sheave 8 (attached to the A-frame 6) the device 10 according to the present invention is interposed, as a possible embodiment. In FIG. 3 the position of the device 10 can be referred to as being at the vessel side. It is also possible to position the device 10 opposite to the sheave 8. In this case the position of the device 10 will be at the "water side" of the sheave 8. The device 10 could be referred to as a Storage Transfer Application Removal system (STAR) because when reeling out the cable, bundling means, such as clips from a storage will be transferred towards the cables in order to be fixed to the cables. When reeling in the cables it is necessary to remove the bundling means in order to be able to reel in both cables, each on a respective winch at a monitored speed and tension.

Figure 4:
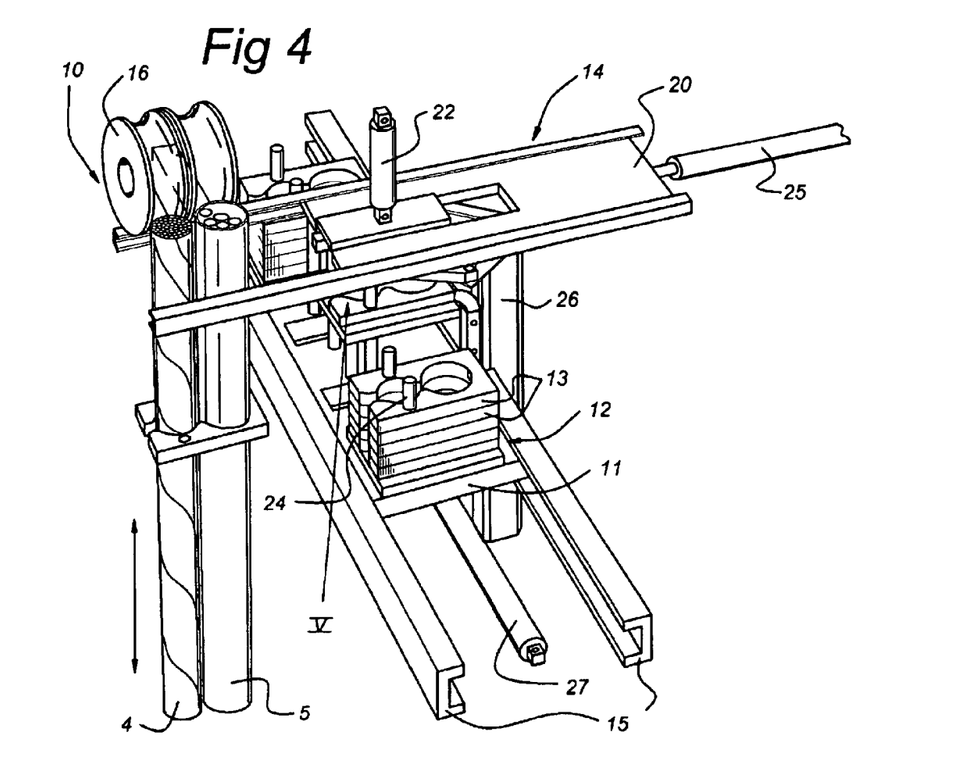
FIG. 4 shows the apparatus according to the invention for bundling a first and a second cable.

In FIG. 4 a possible embodiment of the device 10 according to the present invention is shown. The device 10 comprises a storage unit 11 wherein multiple clip stacks 12 are present, each comprising clips 13. From the storage 11 individual clips 13 can be presented to a dispenser assembly 14 which is adapted to move the clips towards the cables 4, 5 to be bundled and to fix the clips around the cable assembly 4, 5. Knowing that the clip will exert more pressure on the lifting cable/rope than on the umbilical, when the section of the clip will be 1 mm bigger than the section of the umbilical in order for the latter to be allowed to move vertically at a slightly different speed than the hoisting cable/rope. The storage unit 11 is movable in guides 15, the guides 15 being essentially perpendicular to the direction of movement of the dispenser assembly 14. In order to ensure a safe and correct positioning of each clip around the cable assembly 4, 5, further guide means 16 are present, in the present embodiment shown as sheaves, in order to guide the cable assembly through the device 10. Therefore the distance between the cable assembly 4, 5 and the dispenser assembly 14 is known during application and removal of the clips from the cable assembly 4,5. Hereafter the details of the device 10 and the functioning thereof will be described, wherein reference will be made to a "storage position", being a possible position of the storage unit 11. In the storage position the clip is transferred from the storage unit to the dispenser assembly or visa versa Further reference will be made to a "cable position", being a possible position of the dispenser assembly 14 and the clip 13. In this position the clip 13 can be connected to or disconnected from the cables 4,5.

The dispenser assembly 14 comprises a dispenser slide 20. The dispenser slide 20 slides in a plane to move a clip 13 from the "storage position" to the "cable position". The movement is achieved by means of an opening cylinder 21 (see FIG. 5). Moreover the dispenser assembly 14 comprises a push back cylinder 22. This push back cylinder will be used when a clip is removed from the cable assembly 4, 5. By means of the push back cylinder 22 a clip 13 will be pushed from the guide pins 23 (see FIG. 5) onto guide bars 24, which are present in the storage unit. Moreover the dispenser assembly 14 comprises a dispenser cylinder 25. This dispenser cylinder 25 will be used to move the dispenser slide 20 from the storage position to the cable position and visa versa. The device comprises a further cylinder with reference number 26. This cylinder is called a lifting cylinder, and is used to push a pile of clips 12 upwards towards the dispenser assembly 14.

According to FIG. 4 two guide bars 24 are present. Both guide bars 24 fit in the holes which are present in the clip 13. The guide bars are used to position the clips during storage. According to FIG. 4 the guide bars are aligned with the guide pins 23, which are present in the dispenser assembly.

The device 10 also comprises a storage cylinder 27. This storage cylinder is used to move the storage units 11 to and from the storage position.

Figure 5:
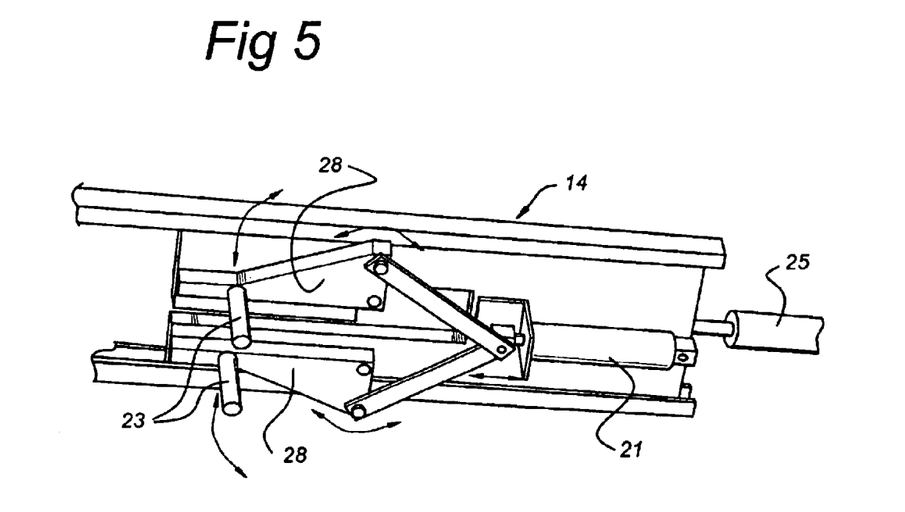
FIG. 5 shows a further detail of the apparatus according to FIG. 4.

With reference to FIG. 5 a bottom view is shown of the assembly 14 according to FIG. 4. In FIG. 5 the opening cylinder 21 is shown, which is used to move opening levers 28. Both opening levers 28 are provided with a guide pin 23. Both guide pins 23 fit in corresponding holes, provided in the clips 13. The guide pins are used to open the clips by transferring the movement of the opening lever 28. Both opening levers 28 are connected to the dispenser assembly 14 by means of a hinge. In order to transfer the movement of the opening cylinder 21 to the guide pins 23.

When using the apparatus according to FIG. 4 and 5, when deploying a load from a vessel 1 by means of a first and second cable 4, 5, it is important to make a connection between an heave compensating system present on the vessel and the apparatus 10 according to FIG. 4 and 5. Because of the heave compensating systems the cables will move up and down with respect to the apparatus 10 when reeling in the cables 4, 5 and when reeling out both cables at a high speed. Therefore, the apparatus according to the present invention will have to be able to work at a high speed. The speed of the cable with respect to the vessel can be as high as 2.3 m/s. This will require a very high movement of the apparatus itself.

In order to ensure safe and correct connection of the clips with the cables, it is advantageous to be able to measure the speed of the cables with respect to the ship and with respect to the apparatus itself. Therefor sensor means are present (not shown) in order to measure the speeds of the respective cables. Those sensor means can be coupled to processor means, such as a computer (not shown). Those processor means have to be adapted for processing the data generated by the sensor means, in order to be able to control the bundling apparatus correspondingly.

According to the present invention it is advantageous to detect the heave compensation which is exerted on the main winch 7a, in order to control the movement of a load with respect to the seabed. The heave compensating on the main winch will be referred to as being a "master compensating". The constant tension of the umbilical winch 5a will be "slaved" to the compensation of the main winch. Therefore the movement of both cables 4, 5 with respect to the vessel and therefore with respect to the apparatus 10 will be linked.

Because of the fact that the apparatus 10 according to the present invention is able to cooperate with the heave compensating system on the hoisting machine on a vessel, a distinction is made between reeling cables in and out:

When the general direction of the cables 4, 5 is reeling out, the situation might occur that the heave compensation system requires the cables 4, 5 to be reeled in just after the application of a clip 13. In that case the clip 13 has to be disconnected from the cables 4, 5 again. With the current configuration of the apparatus 10, the dispenser assembly 14 keeps its position at the cable position (=cable transfer point). The clip 13 then is applied to and removed from the cables 4, 5 until the travel of the cables 4, 5 becomes larger than the travel due to heave compensation. Only then, the dispenser assembly 14 retracts to the storage position (=dispenser transfer point) where a new clip 13 is transferred from the storage unit 11 to the dispenser assembly 14.

When the general direction of the cables is reeling in, the dispenser assembly 14 removes a clip 13 from the cable assembly 4, 5 as soon as the clip 13 reaches the cable position (=cable transfer point). The dispenser assembly 14 immediately retracts to the storage position and the clip 13 is put back in the storage unit 11. Thereafter the dispenser assembly 14 returns to the cable position and waits for the next clip to be removed from the cable assembly 4, 5.

Because of the heave compensation procedure described above, the storage unit 11 and the dispenser assembly 14 can be designed as separate elements of the apparatus 10.

Figure 6A:
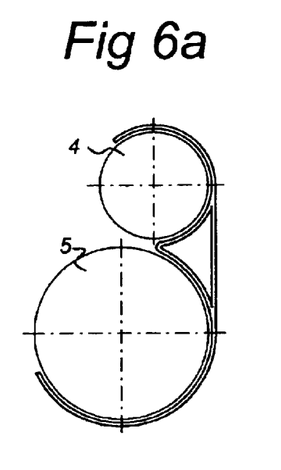
FIGS. 6a, 6b and 6c show basic shapes for elements for connecting a first and a second cable.
Figure 6B:
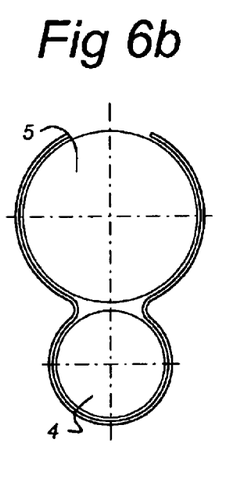
Figure 6C:
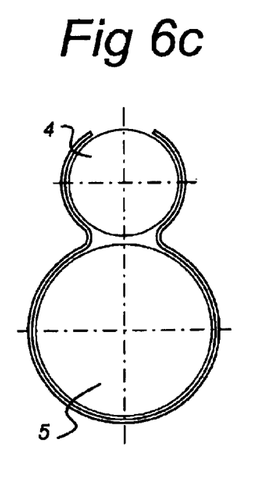

For the clip 13 to be used with the apparatus 10 according to the present invention three basic types can be distinguished. These basic clip-types are shown in FIGS. 6a, 6b and 6c respectively. The clip shape according to FIG. 6a requires a large opening in the clip, the large opening being able to accommodate both the load carrying cable 4 and the umbilical cable 5.

According to the shape shown in FIG. 6b both cables 4, 5 are fully enclosed by the clip.

According to FIG. 6c an other shape is provided for fully enclosing both cables 4, 5. By means of the clips according to FIG. 6c the load carrying cable 4 will be tightly clamped by means of the clip. The larger umbilical is vulnerable and the clamping force on the outside of this umbilical 5 cannot be too high. Therefore it is advantageous not to exceed the clamping force with the clip on the umbilical 5.

Figure 7:
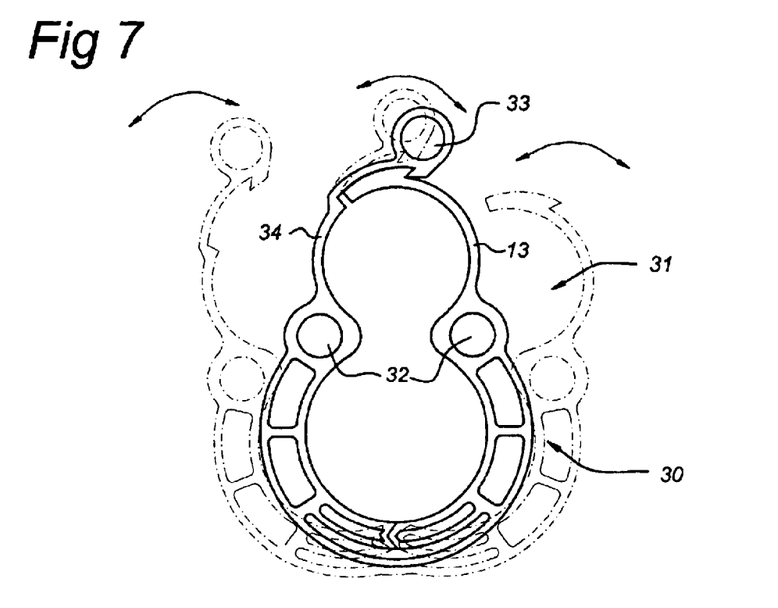
FIG. 7 shows a preferred embodiment of a clip according to the present invention.

In FIG. 7 a possible embodiment of a clip 13 according to the type shown in FIG. 6c is shown. In FIG. 7 in full lines the clip 13 is shown in the closed position, where is in dashed lines the clip 13 is shown in an open position to receive a first and a second cable. The clip 13 is able to receive a first (smaller) lifting and a bigger umbilical (data cable). In order to be able to let the data cable essentially free (limit the clamping force on the outside of the data cable) a relatively stiff bottom section 30 is present to accommodate an umbilical. At this relatively stiff part of the clip 13 a hinge 31 is present in order to be able to open the clip 13. The stiff section 30 by means of openings 32 is connected to a flexible section 31. The openings 32 being adapted for accommodating pins, which form part of an opening and closing mechanism. A further opening 33 is present, for receiving a further pin, being part of the mentioned opening and closing system. The relatively stiff bottom section 30 is connected to a more flexible upper section 34. The upper section in use being adapted for accommodating the load carrying cable 4. A first opening and closing mechanism is described with reference to FIGS. 4 and 5. A further opening and closing mechanism win be described with reference to FIG. 12.

The clip according to FIG. 7 can be produced using injection moulding. It is advantageous to produce the clips in the open position, as shown in dashed lines in FIG. 7. This has the advantage that if the clips are stored, this will be in the open position and therefore in a stress-free state. If the machine is designed such that the clips in the apparatus 10 will be fixed to the pins 23, 24 respectively, by friction, then the clips should be manufactured in a position in between the fully closed and the fully open position. In the open position then the clips will exert a normal force to the pins 23, 24. The clips for instance could be made from polypropylene (PP) or CARILON™. Both materials can be used for injection molding and have a high chemical resistance. CARILON™ is more expensive but has an even higher chemical resistance and durability than PP.

Figure 8:
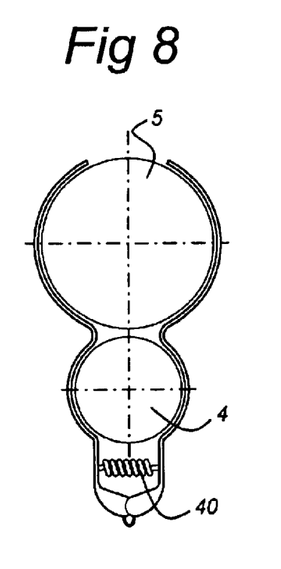
FIG. 8 shows a further embodiment of the clip provided with a tension spring.

In order to increase the clamping force exerted on the cables a spring could be added to the clip. In FIG. 8 a first embodiment is shown of a clip provided with a tension spring 40.

Figure 9:
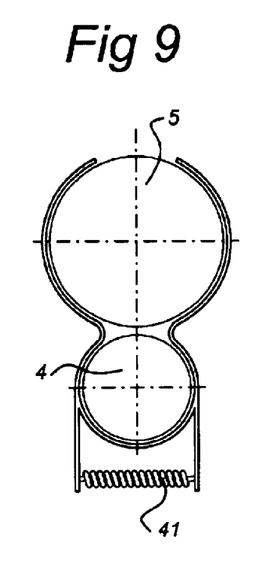
FIG. 9 shows a further embodiment of the clip according to the present invention provided with a compression spring.

In FIG. 9 a further embodiment is shown when the clip is provided with a compression spring 41. The springs 40, 41 according to FIGS. 8 and 9 could be used in stead of or in addition to the closing mechanism of the clip according to FIG. 7.

Figure 10:
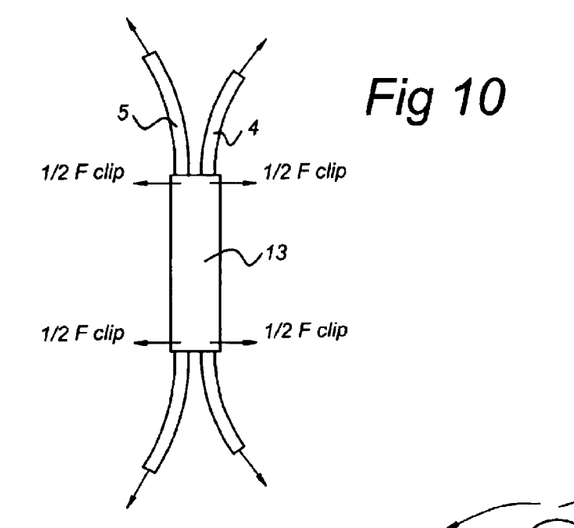
FIG. 10 shows the loads exerted on a clip provided for bundling a first and a second cable.

FIG. 10 shows the forces of the cables acting on the clip 13. The clip 13 is shown in a diagram. The cables 4, 5 have virtually no bending stiffness, so in order to exert a horizontal load, the cables 4, 5 have to be under a certain angle. The horizontal component of the cable tension load equals the clip load. Since the tension in the cables is high, the angles will be small. For the lifting cable 4, with a pretension of 160,000 N the angle is sin ((1252/2)/160,000)=0.22°. A possible impact on the clip can be deducted.

When the force is exerted on the clip F>2000 N, and the clip is made of PP the thickness of a clip for clamping a standard load carrying cable and a standard umbilical will be approximately 30 mm.

Figure 11:
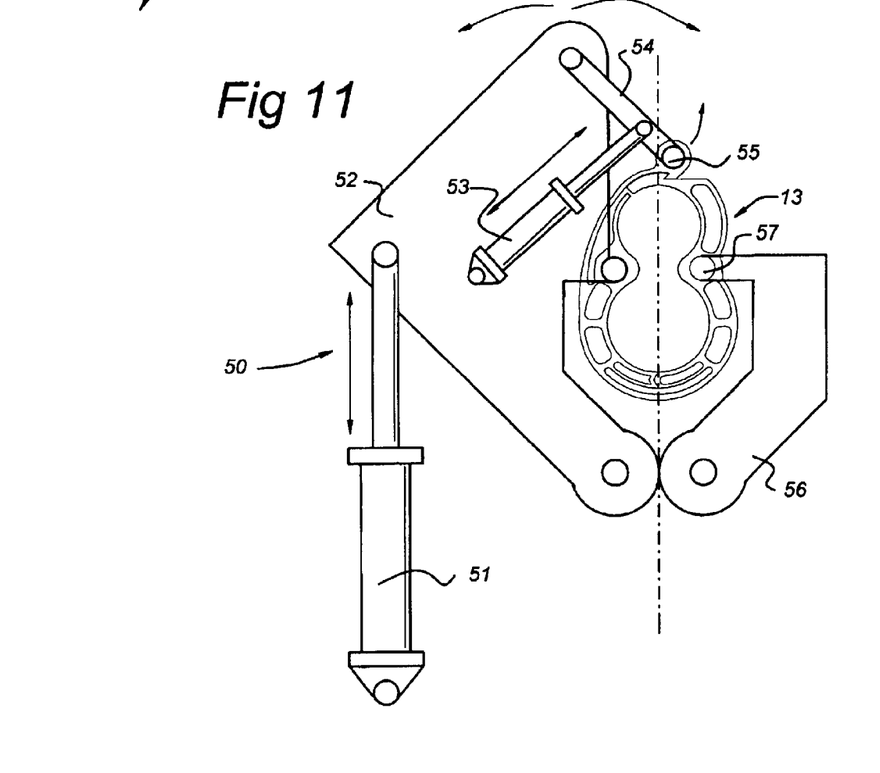
FIG. 11 shows a further mechanism for opening and closing a clip according to the present invention.

With respect to FIG. 11 a further embodiment of an opening and closing mechanism 50 is shown, for instance to be used as a dispenser assembly 14, in the apparatus shown in FIG. 4. The assembly 50 comprises one opening cylinder 51 connected with a first hinge element 52. This hinge element 52 is provided with a lock cylinder 53. Me lock cylinder 53 is connected to a lock pin lever 54. The lock pin lever comprising a lock pin 55 for opening and closing the clip 13. The system 50 further comprises a second hinge element 56 provided with a pin 57 at the end thereof.

Figure 12:
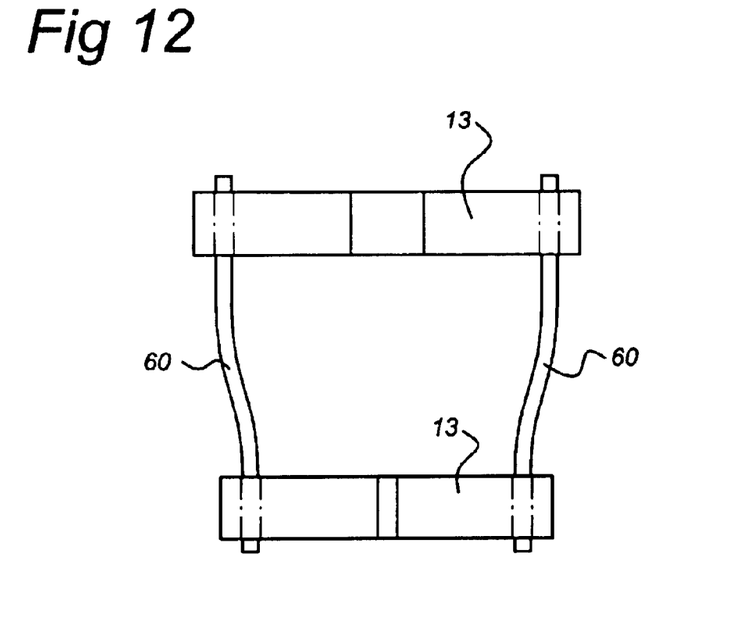
FIG. 12 shows an opening and closing system according to a static pin concept.

In use, the reeling speed of the cables 4,5 with respect to the apparatus 10 according to the present invention will be high, leading little time available to connect and disconnect the clip 13 from the cable assembly 4,5. In order to increase the available time the application direction could be chosen orthogonal to the moving direction of the cables. According to this embodiment the clips 13 will be opened and closed by means of guiding pins along which the clips 13 can slide while they are being connected to or disconnected from the cables 4, 5. Increasing the length of the guide pins 60 will increase the time available for disconnecting or connecting the clip 13. A possible embodiment of guide pins 60 is shown in FIG. 12. Moving a clip 13 downwards along the guide pins 60 the clip 13 can be closed, whereas a clip moving upwards along the guide pins 60 will be opened.

The length of the pins 60 governs the time needed to open and close the clips 13. For instance, if the clip is 50 mm high and the pins are 100 mm long, the maximum sliding distance is 50 mm. With a maximum speed of 2.4 m/s, the closing/opening time will be 0.02 seconds. Even when using pneumatic cylinders this is a very short time. A typical cylinder with a diameter of 50 mm and a stroke of 50 nm uses 0.3 seconds for its complete travel. The mass that has to be accelerated is rather low, the travel distance can be small, but the opening force can be high.

Figure 13:
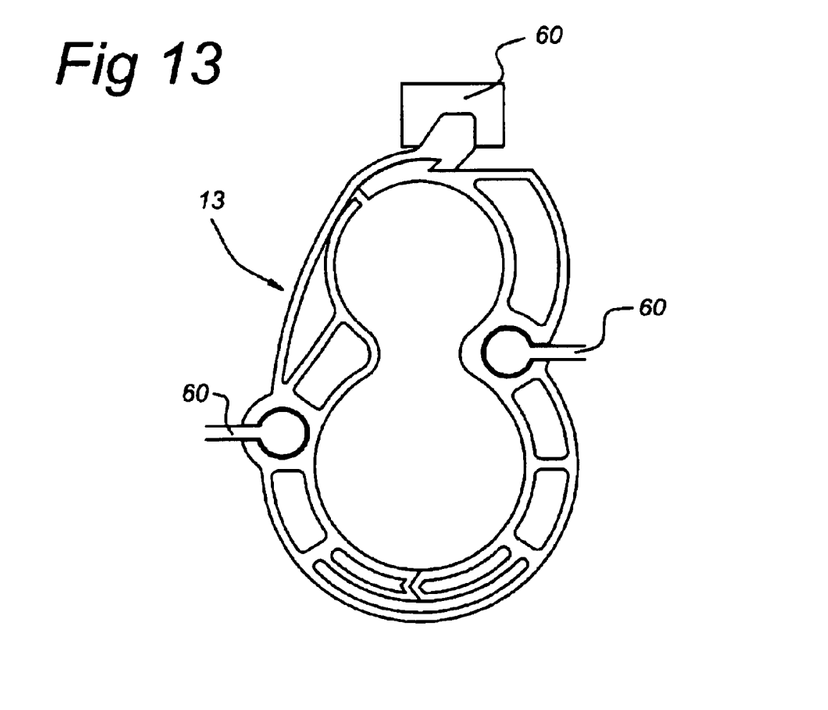
FIG. 13 shows a clip to be used with the system according to FIG. 12.

Increasing the pin length increases the time frame for the opening/closing sequence. But the length of the pins is limited. If the pins are too long, the stiffness will be lost and therewith accuracy. The diameter of the pins is in the order of magnitude of 10 mm, and the length of 1000 mm is suspected not to be feasible. An option to overcome this problem is to use slots instead of holes in the clip, as is shown in FIG. 13. Now the pins 60 can be supported and the length is not limited anymore. If the pins are 750 mm long, the opening/closing time will be approximately 0.3 seconds. As shown in FIG. 12, the static guide pins 60 will be static but curved, such that the clip is automatically closed or opened if the clip is forced to move along these pins. If the friction between the cable and the clip is high enough, the cable can move the clips along the static curved pins. If the friction between cables 4, 5 and clip 13 is not high enough or when the cables are standing still, the clip 13 has to be actively moved along the pins. This concept eliminates the demanding influence of the cable speed on the design.

When using the closing and opening mechanism as described with reference to FIGS. 12 and 13, the storage could be provided above the guiding pins 60. If the clip 13 is to be removed from the cables, it can have any position on the pins 60. There has to be a device to move it from this position back into a storage area If the clip is to be applied to the cables, it has to be at the top of the pins 60 to be able to use the full sliding distance. This implies that if the storage area for the clips 13 is above the pins, this latter movement is much smaller, which will result in a cheaper and quicker system.

For the static pins 60 according to FIG. 12, there is another important advantage in locating the storage above the dispenser. The clip 13 will be closed if it is released at the bottom of the pins 60, and opened and stress-free if it is released at the top, and ready to be fed to the storage.

Figure 14:
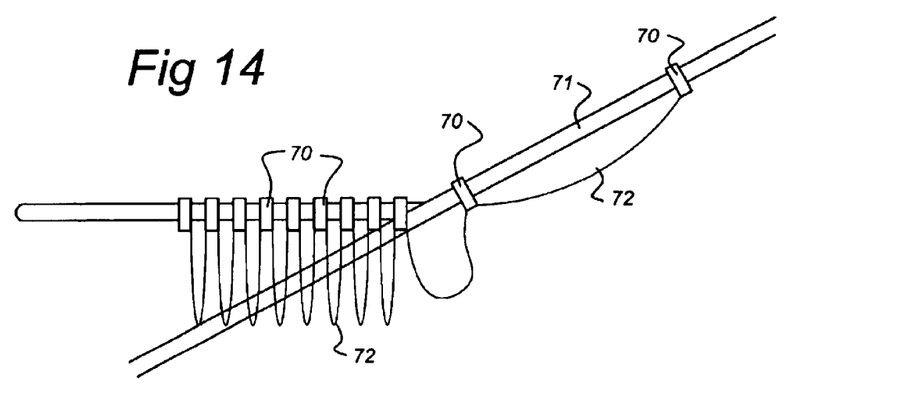
FIG. 14 shows a further embodiment of an element for connecting the first and second cable.

In the present text reference is made to the possibility for bundling at least a first and a second cable, for instance a load carrying cable 4 and an umbilical 5. Moreover in the text as bundling means clips 13 are described, for instance with reference to FIGS. 7, 8, 9 and 13. However, as an alternative several other possibilities could be used for bundling at least a first and a second cable, for instance when deploying a load from a vessel towards the seabed. The first alternative solution is shown in FIG. 14. In this figure bundling means such as clips 70 will be applied to a cable assembly 71. In the solution according to FIG. 14 the connecting means 70 are interconnected by threads 72. From a storage (not shown) the interconnected means 70 will be fed towards the cable assembly 71.

Figure 15:
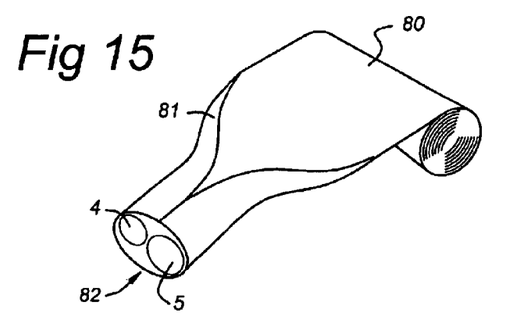
FIG. 15 shows a connecting element in the form of a continuous open sheet for connecting a first and second cable.

A further possibility for bundling two or more cables is shown in FIG. 15, in this case the connecting means consist of a continuous foil 80 with a closing mechanism attached to it. The foil is led around the cable assembly 82 and then closed. The mechanism is referred to as number 81, being a zipper, VELCRO™, hooks and loops, a snap fastener or a hook and wire solution.

The advantage of this solution is that the strip can be reeled in and thus can be exchanged without disconnecting the cables. In this solution VELCRO™ seems to be the most feasible way for connecting the foil. Due to the necessary speed, robustness, it's low necessary accuracy during closing and a larger number of cycles. VELCRO™ comprises two different tapes, the hook and loops. When closing the VELCRO™ it needs to be pressed at both sides. The design of the hooks and loops depend upon the specifications, such as the number of cycles, strengths, etc. There are types of VELCRO™ that can be opened or closed a thousand of times. The strengths of these types are lower than that of the types that are meant for a few numbers of cycles only. However, a typical strength of a large cycle VELCRO™ type is 5 N/cm$^2$.

Figure 16:
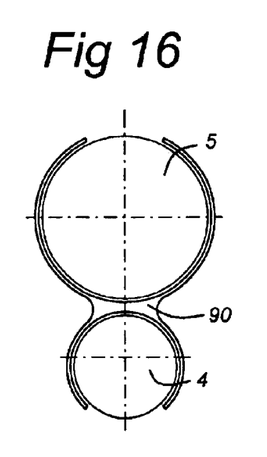
FIG. 16 shows a continuous snap lock for connecting a first and second cable.

A further alternative for connecting an umbilical 5 and a load carrying cable 4 is shown in FIG. 16. In this case, both cables 4, 5 are connected by means of a continuous strip 90, which holds the cables 4, 5 in a snaplock. The locking mechanism is thus the flexibility of the strip 90. Therefore, the strip 90 best can be made of a thermoplastic. Because of the fact that the strip 90 is continuous, the clamping force per unit length can be low compared to the concept using discrete clamps. An advantage of this concept is that the cables are protected over a large part of their surface.

In the configuration according to FIG. 16 the enclosure by means of the continuous strip can only be taken off the vessel side of the sheaves. So, the enclosure should not be damaged by the sheaves. A larger diameter of the sheave can be used to decrease the surface pressure on the sheave, and thus on the enclosure 90. The material of the enclosure 90 should be able to withstand this pressure without damage.

Figure 17:
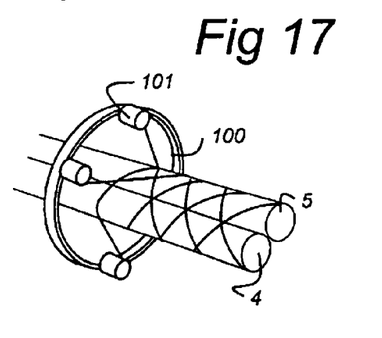
FIG. 17 shows a braiding wheel for connecting a first and a second cable.

A further possibility for connecting first and second cables 4, 5 is shown in FIG. 17. In fact, FIG. 17 a braiding wheel 100 is shown having 4 carriers 101, each of the carriers 101 adapted for applying yams of fibre around the cables 4, 5. The braiding process according to FIG. 17 is widely used in other industries, such as the textile industry where braiding is used for creating yams out of fibres and in the composite industry for the creating of carbon and glass fibre. According to the invention a possible braiding process has to be reversible.

In the present invention reference is made to an apparatus and a method for deployment of an object in water. It should be noted that the apparatus and the method according to the present invention also be used during recovery. When the cables are reeled in bundling elements can be removed from the cables in order to be able to reel in the cables separately.

It should be noted that for the man skilled in the art it is possible to derive other solutions for connecting a first and second cable, while deploying a load, for instance from a vessel towards the seabed. Such modifications are meant to be described in the following claims.

What is claimed is:

1. A deployment apparatus for deployment of an object in a fluid, e.g. the sea, by means of at least a first and a second cable, such as a load carrying cable and a data-end-power umbilical, to be connected to the object, the apparatus comprising first and second winch means for respectively reeling in and out the first and second cable in order to allow movement of the object with respect to the apparatus, the winch means being connected to a heave compensating system, in order to control the movement of the load with respect to the seabed during deployment thereof, wherein the first and second winch means are provided with control means which cooperate in order to synchronize the cable speed of both first and second cable and wherein the apparatus is provided with a bundling apparatus for bundling the cables, when reeled out, in order to provide a single cable assembly between the apparatus and the object during deployment, the bundling apparatus being provided with sensor means for measuring the speed of the cables with respect to the bundling apparatus, the sensor means being connected to the bundling apparatus by means of processing means, such as a computer, for controlling the bundling apparatus dependent on the speed of the cables.

2. The apparatus according to claim 1, wherein the bundling apparatus is adapted to enclose the first and the second cable by means of discrete bundling elements.

3. The apparatus according to claim 2, wherein the discrete bundling elements are formed as rings or clips.

4. The apparatus according to claim 1, wherein the bundling apparatus is adapted for application to and removal from the bundling elements from the cables.

5. The apparatus according to claim 1, wherein the bundling apparatus is provided with a storage for bundling elements, such as clips.

6. The apparatus according to claim 5, wherein the bundling apparatus is provided with a dispenser assembly, the dispenser assembly being movable between a storage position adjacent the storage for feeding one or more clips to the dispenser assembly and a cable position, adjacent to the path of the cables through or along the apparatus, for application of the clips around the at least first and second cable.

7. The apparatus according to claim 6, wherein the dispenser assembly is provided with means for opening and closing a clip.

8. The apparatus according to claim 7, wherein the means for opening and closing a clip comprise pins, which pins cooperate with respective holes in the clips.

9. The apparatus according to claim 7, wherein the pins for opening and closing a clip are fixed on a first and a second lever, the levers being connected to a single actuating element.

10. The apparatus according to claim 9, wherein the actuating element is a pneumatic cylinder.

11. The apparatus according to claim 1, wherein the apparatus is provided with a cable guide, for guiding the cables along the cable position.

12. The apparatus according to claim 1, wherein the bundling apparatus is adapted to enclose the first and second cable by means of a continuous enclosure.

13. The apparatus according to claim 12, wherein the bundling apparatus is adapted to enclose the first and second cable by means of an enclosure foil.

14. The apparatus according to claim 12, wherein the bundling apparatus is adapted for connection to both the first and second cable by means of a continuous snap lock.

15. The apparatus according to claim 1, wherein the sensor means comprises a first sensor for measuring the movement of the first winch means, the first sensor, by means of the processing means, being connected to the control means of the second winch means, for controlling the speed of the second winch means dependent on the speed of the first winch means.

16. The apparatus according to claim 1, wherein the apparatus is provided with a frame, the frame carrying a sheave for guiding the cables, wherein the bundling apparatus is positioned downstream of the sheave when regarding the cable movement during deployment.

17. The apparatus according to claim 16, wherein the sheave is provided with a double groove for accommodating both a first and a second cable, in order to synchronize the cable speed of both cables.

18. A clip, to be used with the apparatus according to claim 1, wherein the clip is adapted to receive a first and a second cable, the clip being movable from a first position for receiving the cables and a second position, wherein the clip is closed for enclosing the cables.

19. The clip according to claim 18, wherein the clip is provided with a snap lock.

20. The clip according to claim 18, wherein the clip is provided with two or more through holes, the through holes being adapted to receive opening and closing pins.

21. The clip according to claim 18, wherein the clips comprise a relatively stiff section, for receiving a first cable, which stiff section adjoins a relatively flexible section, for receiving a second cable.

22. The clip according to claim 21, wherein the snap lock is provided in the relatively flexible section.

23. A vessel comprising the deployment apparatus according to claim 1.

24. A method for deploying a load in a fluid with an apparatus, wherein the load is raised and lowered by means of at least first and second cables connected to the load, wherein the first and second cables are reeled in and out respectively in order to allow movement of the load with respect to the apparatus, the first and second cables being reeled in and out as a compensating system in order to control the movement of the load with respect to the fluid bed during deployment thereof, wherein speeds of both the first and second cables are synchronized with control means and the cables are bundled when reeled out from the apparatus in order to provide a single cable assembly between the apparatus and the load during deployment, bundling of the cables being controlled with sensor means for measuring the speed of the cables with respect to the bundling apparatus, the sensor means being connected to the bundling apparatus by means of a processing means.

25. The method according to claim 24, wherein the cables are connected by means of discrete bundling elements.

26. The method according to claim 25, wherein the discrete bundling elements are interconnected by means of threads, wherein a further bundling element engages the cables by pulling the further bundling elements towards the cables by means of the interconnection, wherein the speeds of the cables are used for engagement of the further bundling element to the cable.

27. The method according to claim 24, wherein the cables are connected by means of a continuous bundling element.

28. The method according to claim 27, wherein the continuous bundling element has the form of a continuous snap lock element, that is adapted for receiving at least the first and second cables.

29. The method according to claim 27, wherein the cables are connected by means of braiding.

* * * * *